(12) United States Patent
Berard et al.

(10) Patent No.: US 10,982,716 B2
(45) Date of Patent: Apr. 20, 2021

(54) BEARING ASSEMBLY HAVING CYLINDRICAL ROLLING ELEMENTS

(71) Applicant: SKF Aerospace France S.A.S, Montigny-le-Bretonneux (FR)

(72) Inventors: Sebastien Berard, Valence (FR); Jean-Philippe Clauvelin, Valence (FR); Vincent Guyard, Assieu (FR); Philippe Mathieux, Condamine (FR); Aiouba Omar, Valence (FR); Frederic Pauget, Saint Jean d'Etreux (FR)

(73) Assignee: SKF Aerospace France S.A.S, Montigny-le-Bretonneux (FR)

(*) Notice: Subject to any disclaimer, the term of this patent is extended or adjusted under 35 U.S.C. 154(b) by 0 days.

(21) Appl. No.: 16/788,415

(22) Filed: Feb. 12, 2020

(65) Prior Publication Data

US 2020/0300301 A1 Sep. 24, 2020

(30) Foreign Application Priority Data

Mar. 18, 2019 (FR) ...................................... 1902741

(51) Int. Cl.
 *F16C 19/36* (2006.01)
 *F16C 33/58* (2006.01)
 *F16C 19/22* (2006.01)

(52) U.S. Cl.
 CPC ............ *F16C 33/585* (2013.01); *F16C 19/22* (2013.01)

(58) Field of Classification Search
 CPC ........ F16C 19/22; F16C 19/225; F16C 19/24; F16C 19/26; F16C 33/585; F16C 33/605
 See application file for complete search history.

(56) References Cited

U.S. PATENT DOCUMENTS

| 4,657,414 A | 4/1987 | Stella |
| 4,881,828 A | * 11/1989 | Kato .................... F16C 19/522 |
| | | 384/127 |
| 4,955,732 A | * 9/1990 | Behrens .................. F16C 19/46 |
| | | 384/484 |
| 4,998,346 A | 3/1991 | Behrens |

(Continued)

FOREIGN PATENT DOCUMENTS

| CN | 106194994 A | 12/2016 |
| DE | 923760 C | 2/1955 |

(Continued)

*Primary Examiner* — Phillip A Johnson
(74) *Attorney, Agent, or Firm* — Garcia-Zamor Intellectual Property Law; Ruy Garcia-Zamor; Bryan Peckjian

(57) ABSTRACT

A bearing assembly having cylindrical rolling elements, an inner ring, an outer ring, and a plurality of cylindrical rolling elements arranged radially between the internal raceway and external raceway. The inner ring includes an annular shoulder that protrudes with respect to the internal raceway, a fillet in the form of a circular arc being defined between the annular shoulder and internal raceway. The outer ring has an annular shoulder that protrudes with respect to the external raceway, the annular shoulder of the outer ring being housed axially between the annular shoulder of the inner ring and the cylindrical rolling elements. The annular shoulder of the outer ring is provided with an annular chamfer in the immediate vicinity of the fillet defined on the inner ring.

4 Claims, 1 Drawing Sheet

(56) References Cited

U.S. PATENT DOCUMENTS

| | | | |
|---|---|---|---|
| 7,713,130 B2 * | 5/2010 | Olszweski | F16C 13/006 |
| | | | 464/111 |
| 2014/0219594 A1 | 8/2014 | Lee | |
| 2014/0334760 A1 | 11/2014 | Abrahamson | |
| 2018/0298945 A1 * | 10/2018 | Nowatari | F16C 19/225 |

FOREIGN PATENT DOCUMENTS

| | | |
|---|---|---|
| DE | 3931709 A1 | 3/1990 |
| DE | 102015207655 A1 | 10/2016 |
| DE | 102016219059 A1 | 4/2018 |
| EP | 0597438 A1 | 5/1994 |
| EP | 2302241 A1 | 3/2011 |
| FR | 2349061 A1 | 11/1977 |
| JP | 2003222226 A | 8/2003 |
| JP | 2004326671 A | 11/2004 |
| WO | 2006091356 A1 | 8/2006 |

* cited by examiner

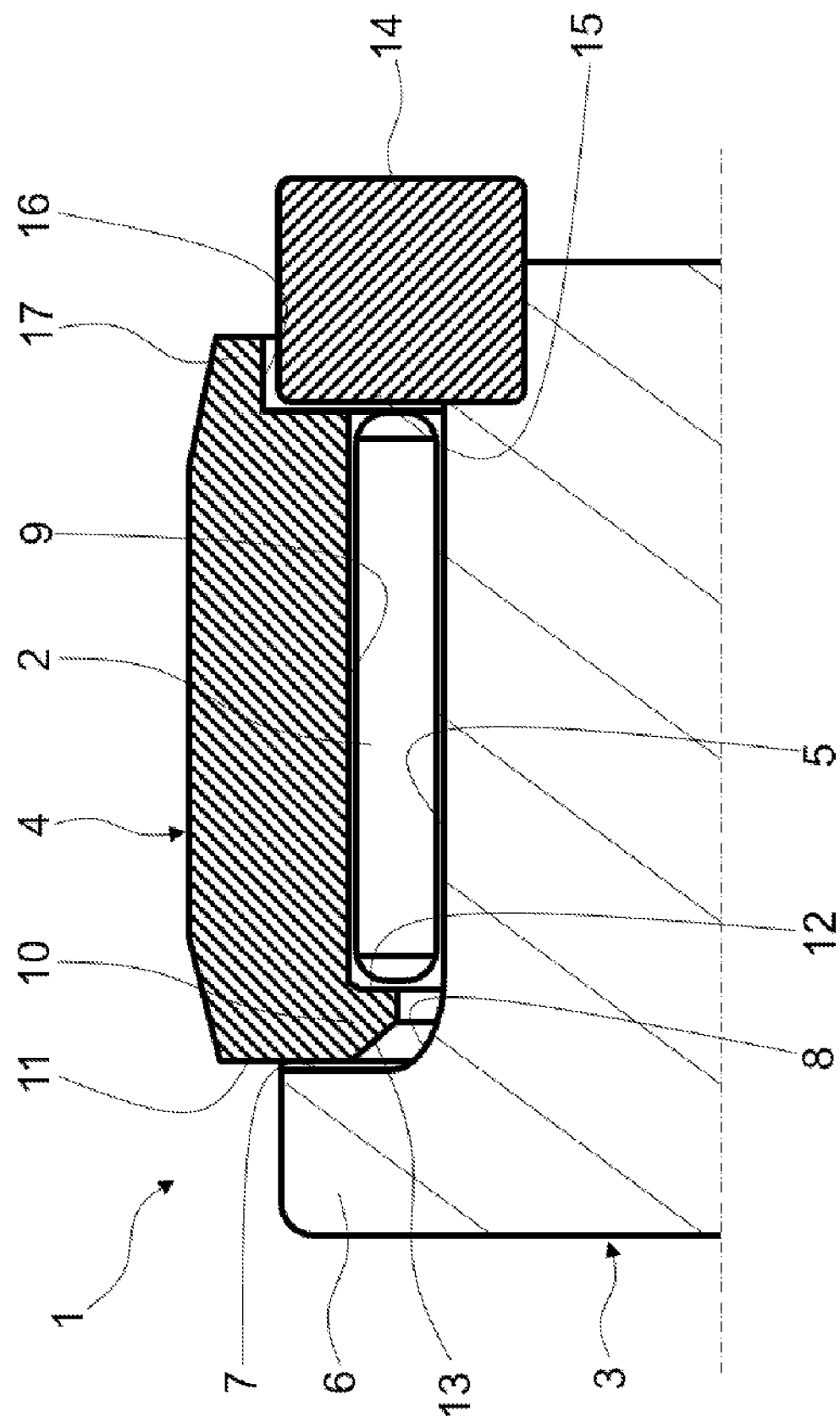

US 10,982,716 B2

BEARING ASSEMBLY HAVING CYLINDRICAL ROLLING ELEMENTS

CROSS-REFERENCE TO RELATED APPLICATIONS

This application claims priority to French Patent Application no. 1902741, filed Mar. 18, 2019, the contents of which are fully incorporated herein by reference.

TECHNICAL FIELD OF THE INVENTION

The present invention relates to the field of needle bearing assemblies.

BACKGROUND OF THE INVENTION

It is known practice to use needle bearing assemblies in numerous industrial, automotive or aeronautical applications. Such assemblies conventionally comprise an inner ring provided with a cylindrical outer surface forming an internal raceway, an outer ring provided with a cylindrical inner surface forming an external raceway, the two rings being coaxial, and a plurality of cylindrical needles arranged radially between the internal raceway and external raceway. One of the main advantages of this type of assembly is that it has optimal radial compactness on account of the small diameter of the needles, while being able to support relatively large radial loads. However, it is necessary to provide, in the structure of the assembly, means for ensuring that the needles are retained between the rings in both axial directions.

In order to meet this need, it is known practice to provide a washer mounted axially between a shoulder of the inner ring, the shoulder protruding radially with respect to the internal raceway, and a lateral surface of the outer ring. However, the connecting angle between the shoulder and internal raceway is subject to loads, and more particularly is a tension-prone region. This can result in more rapid fatiguing of the inner ring at this location, with a significant risk of breakage, and a shorter service life.

It is known practice to provide a fillet with a connecting radius that is as large as possible. However, given the needs in respect of compactness, weight and radial loads to be supported, it is a particularly complex matter to provide the fillet with a satisfactory shape.

SUMMARY OF THE INVENTION

The present invention seeks to remedy the abovementioned drawbacks.

More particularly, the present invention aims to provide a bearing assembly that is less expensive, is easy to manufacture, has optimal compactness capable of supporting significant radial loads, and has a longer service life.

The invention relates to a bearing assembly having cylindrical rolling elements, comprising an inner ring provided with a cylindrical outer surface forming an internal raceway, an outer ring provided with a cylindrical inner surface forming an external raceway, the two rings being coaxial along a central axis, and a plurality of cylindrical rolling elements arranged radially between the internal raceway and external raceway.

According to the invention, the inner ring comprises, at one axial end of the internal raceway, an annular shoulder that protrudes with respect to the internal raceway and is directed in a radial direction away from the central axis, a fillet in the form of a circular arc being defined between the annular shoulder and internal raceway. The outer ring comprises, at one axial end of the external raceway, an annular shoulder that protrudes with respect to the external raceway and is directed radially towards the central axis, the annular shoulder of the outer ring being housed axially between the annular shoulder of the inner ring and the cylindrical rolling elements, the annular shoulder of the outer ring having a first lateral surface that is directed towards the outside of bearing assembly and axially faces a lateral surface of the annular shoulder of the inner ring, and the annular shoulder of the outer ring having a second lateral surface that is directed towards the inside of the bearing assembly and forms an axial abutment surface for the rolling elements. The first lateral surface of the annular shoulder of the outer ring is provided with an annular chamfer in the immediate vicinity of the fillet defined on the inner ring.

According to further advantageous but non-compulsory features of the invention, such an assembly may also include the following features, on their own or in any technically feasible combination:

The inner ring is provided, at another axial end of the internal raceway and on the axially opposite side from the annular shoulder, with a retaining washer mounted securely on the inner ring, the washer having a lateral surface that is directed towards the inside of the bearing assembly and forms an axial abutment surface for the rolling elements.

The outer ring comprises, at another axial end of the external raceway and on the axially opposite side from the annular shoulder, an annular recess that holds a portion of the retaining washer.

The outer ring comprises an annular lip that radially surrounds a portion of the retaining washer.

BRIEF DESCRIPTION OF THE FIGURES

The invention will be understood better from reading the following description, which is given solely by way of non-limiting example.

The description is given with reference to the appended drawing, in which:

FIG. 1 is an axial cross section through a bearing assembly having cylindrical rolling elements according to the invention.

DETAILED DESCRIPTION OF THE INVENTION

FIG. 1 illustrates a bearing assembly, bearing the overall reference 1, having cylindrical rolling elements 2.

The assembly 1 comprises a plurality of cylindrical rolling elements housed between an inner ring 3 and an outer ring 4.

The rings 3, 4 are coaxial about a central axis X1 of the assembly 1 in normal operating mode.

The inner ring 3 comprises a cylindrical outer surface 5 that forms an internal raceway for the cylindrical rolling elements 2.

The inner ring 3 also comprises an annular shoulder 6 that protrudes radially with respect to the internal raceway 5. The shoulder 6 extends in a radial direction away from the central axis X1. The shoulder 6 defines an internal lateral surface 7 that is directed axially towards the rolling elements 2.

A fillet 8 is defined between the annular shoulder 6 and the internal raceway 5 of the inner ring 3. The fillet is in the form of a circular arc in axial cross section and has a radius defined so as to limit the tension in this region in the event of a strong radial load exerted on the assembly 1.

The outer ring 4 comprises a cylindrical inner surface 9 that forms an external raceway for the cylindrical rolling elements 2.

The rings 3, 4 are concentric. In the exemplary embodiment illustrated, the rings are solid, that is to say obtained by machining or grinding with removal of material from metal tubes, bars, forged parts or rolled blanks. The rings 3, 4 are advantageously made of metal, for example steel. Advantageously, the rings 3, 4 may have been subjected to a thermal and/or surface treatment for improving the mechanical and structural properties thereof.

The cylindrical rolling elements 2 each extend along an axis parallel to the central axis X1 and are housed in a radial space defined between the internal raceway 5 and external raceway 9. According to an embodiment that is not illustrated, the cylindrical rolling elements 2 can be kept regularly spaced apart circumferentially by an annular retaining cage.

According to one embodiment, the inner ring 3 is stationary and the outer ring 4 rotates. Alternatively, the inner ring 3 rotates while the outer ring 4 is stationary.

According to one embodiment, the inner ring 3 consists of a shaft provided with a cylindrical outer surface portion that forms the internal raceway 5 for the cylindrical rolling elements 2.

According to the invention, the outer ring 4 also comprises an annular shoulder 10 that protrudes radially with respect to the external raceway 9. The shoulder 10 extends radially towards the central axis X1 of the assembly, and thus towards the inner ring 3.

The shoulder 10 of the outer ring 4 has an external lateral surface 11 that is directed axially towards the outside of the assembly 1, and an internal lateral surface 12 that is directed axially towards the inside of the assembly 1 and the cylindrical rolling elements 2.

The shoulder 10 of the outer ring 4 is housed axially between the shoulder 6 of the inner ring 3 and the cylindrical rolling elements 2. The external lateral surface 11 of the shoulder 10 of the outer ring 4 axially faces the internal lateral surface 7 of the shoulder 6 of the inner ring 3. The internal lateral surface 12 of the shoulder 10 of the outer ring 4 forms an abutment surface in a first axial direction for the cylindrical rolling elements 2.

The external lateral surface 11 of the shoulder 10 of the outer ring 4 is provided with an annular chamfer 13. The chamfer 13 makes it possible to free up a space between the inner ring 3 and outer ring 4, such that the shoulder 10 is in the immediate vicinity of the fillet 8.

By virtue of the invention, the bearing assembly 1 does not require any additional parts for forming an abutment in a first axial direction for the cylindrical rolling elements 2, this function being realized by the shoulder 10 of the outer ring 4. The outer ring 4 is itself retained in this first axial direction by the shoulder 6 of the inner ring 3.

The fillet 8 and the chamfer 13 are dimensioned such that the rings 3, 4 can be assembled as compactly as possible while ensuring enough space for dimensioning the fillet. Thus, it is possible to provide any feasible shape and radius of curvature for supporting as reliably as possible the loads exerted radially on the assembly 1 in general, and in the region of the fillet 8 in particular.

Furthermore, the inner ring 3 is provided, at another axial end of the internal raceway 5 and on the axially opposite side from the annular shoulder 6, with a retaining washer 14 that is mounted securely on the inner ring 3.

For example, the washer 14 is fastened securely by screwing a tapped bore of the washer 14 onto a threaded surface of the inner ring 3. According to further alternatives, the washer 6 can be welded, adhesively bonded or fitted in an annular groove provided on an outer portion of the inner ring 3, or any other technically feasible means.

The retaining washer 14 comprises an internal lateral surface 15 that is directed towards the inside of the bearing assembly 1 and towards the cylindrical rolling elements 2. This internal lateral surface 15 forms an abutment surface in a second axial direction for the rolling elements 2. The cylindrical rolling elements 2 are thus held axially between the internal raceway 5 and external raceway 9 by a first surface 12 in a first axial direction and a second surface 15 in a second axial direction.

Furthermore, the outer ring 4 comprises, at another axial end of the external raceway 9 and on the axially opposite side from the annular shoulder 10, an annular recess 16 that holds a portion of the retaining washer 14. The outer ring 4 comprises an annular lip 17 that radially surrounds a portion of the retaining washer 14. The surfaces that are defined by the recess 16 and the lip 17 and face corresponding surfaces of the retaining washer 14 form narrow passages that are able to limit the intrusion of contaminating elements, particles, water, into the radial space between the rings 3, 4. Such an arrangement makes it possible to ensure that the bearing assembly 1 is leaktight and to prevent the premature deterioration of the cooperating bearing surfaces of the cylindrical rolling elements 2, of the internal raceway 5 and of the external raceway 9. The efficiency and service life of the bearing assembly 1 are improved thereby.

Furthermore, all or only some of the technical features of the various embodiments may be combined with one another. Thus, the bearing assembly can be adapted in terms of cost, performance and ease of use.

The invention claimed is:

1. A bearing assembly having cylindrical rolling elements, comprising:
    an inner ring provided with a cylindrical outer surface forming an internal raceway,
    an outer ring provided with a cylindrical inner surface forming an external raceway, the inner ring and the outer ring being coaxial along a central axis, and
    a plurality of cylindrical rolling elements arranged radially between the internal raceway and the external raceway, wherein
    the inner ring provides at a first axial end of the internal raceway, an annular shoulder that protrudes with respect to the internal raceway and is directed in a radial direction away from the central axis, a fillet in the form of a circular arc being defined between the annular shoulder and internal raceway;
    the outer ring comprises, at a first axial end of the external raceway, an annular shoulder that protrudes with respect to the external raceway and is directed radially towards the central axis, the annular shoulder of the outer ring being housed axially between the annular shoulder of the inner ring and the cylindrical rolling elements, the annular shoulder of the outer ring having a first lateral surface directed towards the outside of the bearing assembly and axially faces a lateral surface of the annular shoulder of the inner ring, and the annular shoulder of the outer ring having a second lateral surface directed towards the inside of the bearing assembly and forms an axial abutment surface for the cylindrical rolling elements; and wherein the first lateral surface of the annular shoulder of the outer ring is provided with an annular chamfer which is radially spaced from and is radially opposite the fillet defined on the inner ring.

2. The bearing assembly according to claim 1, wherein the inner ring is provided at a second axial end of the internal raceway and on the axially opposite side from the annular shoulder, with a retaining washer mounted securely on the inner ring, the retaining washer having a lateral surface directed towards the inside of the bearing assembly and forms an axial abutment surface for the cylindrical rolling elements.

3. The bearing assembly according to claim 2, wherein the outer ring comprises, at a second axial end of the external raceway and on the axially opposite side from the annular shoulder, an annular recess that holds a portion of the retaining washer.

4. The bearing assembly according to claim 3, wherein the outer ring comprises an annular lip that radially surrounds a portion of the retaining washer.

* * * * *